United States Patent
Sobel et al.

(10) Patent No.: US 10,203,809 B2
(45) Date of Patent: Feb. 12, 2019

(54) INTERFERENCE DETECTION

(71) Applicant: Synaptics Incorporated, San Jose, CA (US)

(72) Inventors: David Sobel, San Jose, CA (US); Peijun Shan, San Jose, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 1 day.

(21) Appl. No.: 15/605,778

(22) Filed: May 25, 2017

(65) Prior Publication Data
US 2018/0341364 A1 Nov. 29, 2018

(51) Int. Cl.
*G06F 3/044* (2006.01)
*G01D 5/24* (2006.01)
*G06F 3/041* (2006.01)

(52) U.S. Cl.
CPC ............ *G06F 3/0418* (2013.01); *G06F 3/044* (2013.01)

(58) Field of Classification Search
CPC ...................................................... G06F 3/044
See application file for complete search history.

(56) References Cited

U.S. PATENT DOCUMENTS

| 2009/0243633 | A1* | 10/2009 | Brasseur | G01D 5/2405 324/681 |
| 2016/0179243 | A1* | 6/2016 | Schwartz | G06F 3/044 345/174 |
| 2016/0282996 | A1* | 9/2016 | Wu | G06F 3/0418 |
| 2017/0351897 | A1* | 12/2017 | Kremin | G06K 9/0002 |
| 2017/0371470 | A1* | 12/2017 | Nathan | G06F 3/0414 |

* cited by examiner

*Primary Examiner* — Lin Li
(74) *Attorney, Agent, or Firm* — Ferguson Braswell Fraser Kubasta PC

(57) ABSTRACT

An input device including: a first in-phase touch sensing block including: an analog mixer configured to mix a resulting signal associated with a capacitive sensor electrode with a local oscillator (LO) signal; an analog to digital converter (ADC) configured to convert an output of the analog mixer into a digital signal; and a first decimation filter configured to determine an in-phase component of an interference at a frequency of the LO signal based, at least in part, on the digital signal; and a first quadrature interference detection block including: a second decimation filter configured to determine a quadrature component of the interference at the frequency.

20 Claims, 9 Drawing Sheets

INTERFERENCE DETECTION

TECHNICAL FIELD

The described embodiments relate generally to electronic devices, and more specifically, to proximity sensor devices that determine (e.g., measure, estimate, etc.) both the in-phase component and quadrature component of interference at one or more frequencies.

BACKGROUND

Input devices including proximity sensor devices such as touchpads or touch sensor devices, are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones). Proximity sensor devices may also be used to detect finger, styli, or pens.

Interference is often present during the operation of an input device. Accordingly, it may be necessary for the input device to determine the interference at one or more frequencies in order for the input device to mitigate the effects of the interference.

SUMMARY

In general, one or more embodiments relate to an input device. The input device comprises: a first in-phase touch sensing block comprising: an analog mixer configured to mix a resulting signal associated with a capacitive sensor electrode with a local oscillator (LO) signal; an analog to digital converter (ADC) configured to convert an output of the analog mixer into a digital signal; and a first decimation filter configured to determine an in-phase component of an interference at a frequency of the LO signal based, at least in part, on the digital signal; and a first quadrature interference detection block comprising: a second decimation filter configured to determine a quadrature component of the interference at the frequency.

In general, one or more embodiments relate to an input device. The input device comprises: a first in-phase touch sensing block configure to detect user input proximate to a first capacitive sensor electrode and comprising: an analog mixer configured to mix a resulting signal associated with the first capacitive sensor electrode with a first local oscillator (LO) signal, wherein the first LO signal comprises a first frequency; and an analog to digital converter (ADC) configured to convert an output of the analog mixer into a digital signal; and a first quadrature interference detection block comprising: a first plurality of decimation filters configured to determine, based at least in part on the digital signal from the ADC, an in-phase component and a quadrature component of an interference at a second frequency.

In general, one or more embodiments relate to a method for operating an input device. The method comprises: obtaining a resulting signal associated with a capacitive sensor electrode; mixing, by an analog mixer, the resulting signal with a first local oscillator (LO) signal comprising a first frequency; converting, by an analog to digital converter (ADC), a first digital signal from an output of the analog mixer; mixing, by a first digital mixer, the first digital signal with a second digital signal; and determining, by a first decimation filter and based on an output of the first digital mixer, a quadrature component of an interference.

Other aspects of the embodiments will be apparent from the following description and the appended claims.

BRIEF DESCRIPTION OF DRAWINGS

The present embodiments are illustrated by way of example and are not intended to be limited by the figures of the accompanying drawings.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present invention provide input devices and methods that may facilitate improved usability along with various other benefits.

Figure 1:
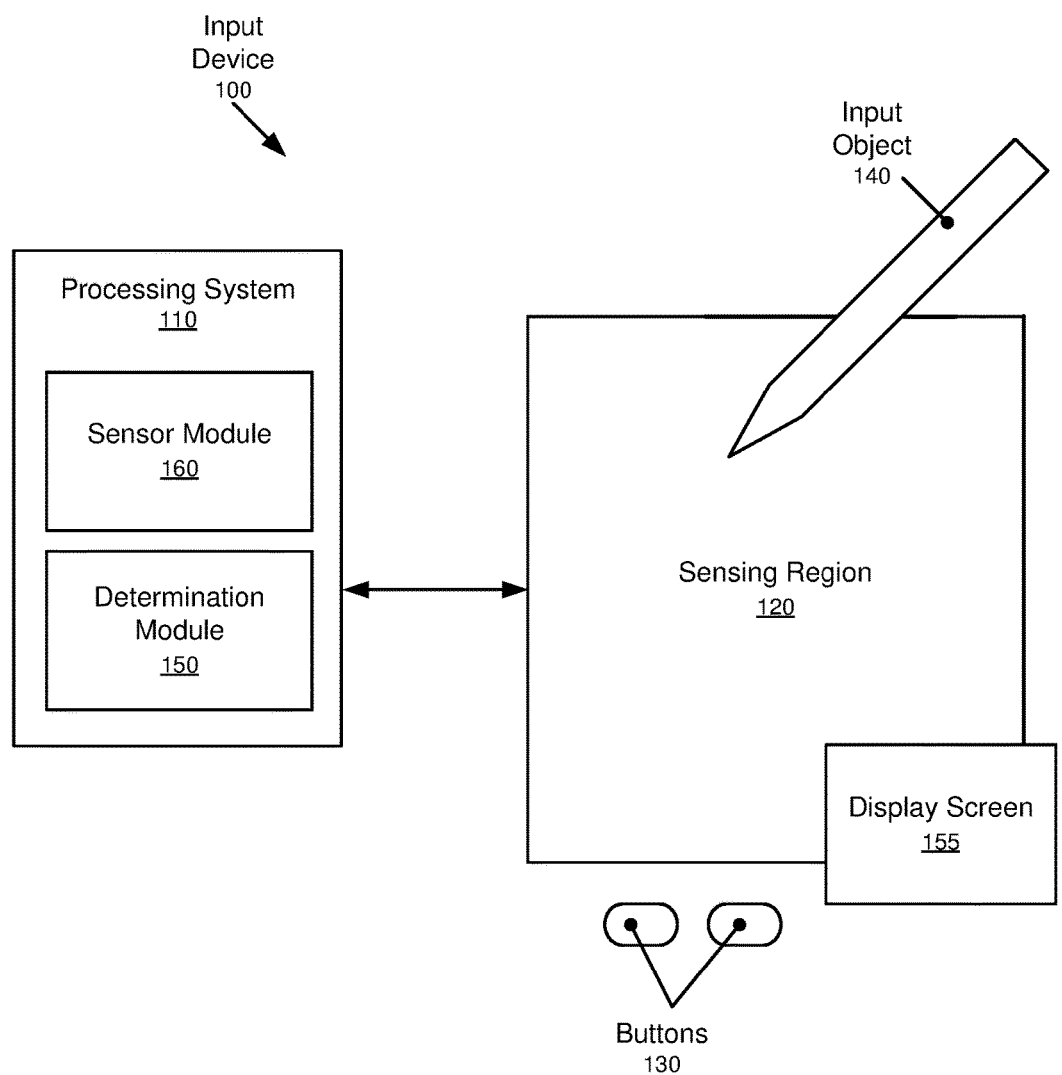
FIG. 1 shows a block diagram of an input device in accordance with one or more embodiments.

Turning now to the figures, FIG. 1 is a block diagram of an exemplary input device (100) within which the present embodiments may be implemented. The input device (100) includes a processing system (110) and a sensing region (120). The input device (100) may be configured to provide input to an electronic system (not shown for simplicity). Examples of electronic systems (or electronic devices) may include personal computers (e.g., desktop computers, laptop computers, tablet computers, netbook computers, tablets, web browsers, e-book readers, and personal digital assistants (PDAs)), composite input devices (e.g., physical keyboards, joysticks, or key switches), data input devices (e.g., remote controls and mice), data output devices (e.g., display screens and printers), remote terminals, kiosks, and video game machines (e.g., video game consoles, portable gaming devices, and the like), communication devices (e.g., cellular phones, such as smart phones), and media devices (e.g., recorders, editors, and players such as televisions, set-top boxes, music players, digital photo frames, and digital cameras). The electronic system can be a host or a slave to the input device.

The input device (100) may be implemented as a physical part of the corresponding electronic system, or may be physically separate from the electronic system. Further, portions of the input device (100) may be part of the electronic system. For example, all or part of the determination module (150) may be implemented in the device driver of the electronic system. The input device (100) may be coupled to and communicate with components of the electronic system using various wired or wireless technologies, such as buses and networks. Example technologies may include Inter-Integrated Circuit (I²C), Serial Peripheral Interface (SPI), PS/2, Universal Serial Bus (USB), Bluetooth®, Infrared Data Association (IrDA), and various radio frequency (RF) communication protocols defined by the IEEE 802.11 or other standards.

In the example of FIG. 1, the input device (100) may correspond to a proximity sensor device (e.g., a "touchpad" or a "touch sensor device") configured to sense input provided by one or more input objects (140) in a sensing region (120). Example input objects include styli, active pen, fingers, fingertips, and the like. The sensing region (120) may encompass any space above, around, in, and/or proximate to the input device (100) in which the input device (100) is able to detect user input (e.g., provided by one or more input objects 140)). The size, shape, and location of particular sensing region (120) (e.g., relative to the electronic system) may vary depending on actual implementations.

In some embodiments, the sensing region (120) extends from a surface of the input device (100) in one or more directions in space, for example, until a signal-to-noise ratio (SNR) of the sensors falls below a threshold suitable for object detection. For example, the distance to which this sensing region (120) extends in a particular direction may be on the order of less than a millimeter, millimeters, centimeters, or more, and may vary with the type of sensing technology used and/or the accuracy desired. In some embodiments, the sensing region (120) may detect inputs involving no physical contact with any surfaces of the input device (100), contact with an input surface (e.g. a touch surface) of the input device (100), contact with an input surface (e.g., a touch surface and/or screen) of the input device (100), contact with an input surface of the input device (100) coupled with some amount of applied force or pressure, and/or a combination thereof.

In various embodiments, input surfaces may be provided by, and/or projected on, one or more surfaces of housing of the input device (100) (e.g., as an image). For example, the sensing region (120) may have a rectangular shape when projected onto an input surface of the input device (100). In some aspects, inputs may be provided through images spanning one, two, three, or higher dimensional spaces in the sensing region (120). In some aspects, inputs may be provided through projections along particular axes or planes in the sensing region (120). Still further, in some aspects, inputs may be provided through a combination of images and projections in the sensing region (120).

The input device (100) may utilize various combination of sensor components and sensing technologies to detect user input in the sensing region (120). Example sensing technologies may include capacitive, elastive, resistive, inductive, magnetic, acoustic, ultrasonic, radio frequency (RF) waves, and/or optical sensing technologies. The input device (100) may include one or more sensing elements configured to implement the various sensing technologies.

In some embodiments, the input device (100) may utilize resistive sensing technologies to detect user inputs. For example, the sensing region (120) may be formed by a flexible and conductive first layer separated by one or more spacer elements from a conductive second layer. The sensing region (120) may detect user input by creating one or more voltage gradients across the layers when the first layer is brought into contact with the second layer. More specifically, pressing the flexible first layer may deflect it sufficiently to create electrical contact between the layers, resulting in voltage outputs reflective of the point(s) of contact between the layers. These voltage outputs may be used to determine positional information (e.g., indicating a position, in the sensing region 120) about the detected inputs.

In other embodiments, the input device (100) may utilize inductive sensing technologies to detect using inputs. For example, the sensing region (120) may include one or more sensing elements configured to pick up loop currents induced by a resonating coil or pair of coils. The input device (100) may then detect user inputs using a combination of the magnitude, phase, and frequency of the currents. The characteristics of the loop currents may be used to determine positional information about the detected inputs.

In yet other implementations, the input device system (100) may utilize radio frequency (RF) technologies to detect user inputs. For example, the sensing region (120) may include one or more sensing elements configured to receive/intercept/detect RF waves.

In some optical implementations of the input device system (100), one or more sensing elements are cameras (e.g., red-green-blue (RGB) cameras, infrared (IR) cameras, ultra violet (UV) cameras, etc.) that generate images of the sensing region and thus any input objects in the sensing region.

In some capacitive implementations of the input device system (100), voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object proximate to the sensor electrodes alters the electric field associated with the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "trans capacitance") sensing methods based on changes in the capacitive coupling between sensor electrodes. In various embodiments, an input object proximate to the sensor electrodes alters the electric field between the sensor electrodes, thus changing the measured capacitive coupling. In one implementation, a mutual capacitance sensing method operates by detecting the capacitive coupling between one or more transmitter sensor electrodes (also "transmitter electrodes" or "transmitter") and one or more receiver sensor electrodes (also "receiver electrodes" or "receiver"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. The reference voltage may be a substantially constant voltage and in various embodiments; the reference voltage may be system ground. In some embodiments, transmitter sensor electrodes may both be modulated. The transmitter electrodes are modulated relative to the receiver electrodes to transmit transmitter signals and to facilitate receipt of resulting signals. A resulting signal may include effect(s) corresponding to one or more transmitter signals, and/or to one or more sources of environmental interference (e.g. other electromagnetic signals). The effect(s) may be the transmitter signal, a change in the transmitter signal caused by one or more input objects and/or environmental interference, or other such effects. Sensor electrodes may be dedicated transmitters or receivers, or may be configured to both transmit and receive. Measurements acquired using mutual capacitance sensing methods may be referred to as mutual capacitance measurements.

Further, the sensor electrodes may be of varying shapes and/or sizes. The same shapes and/or sizes of sensor electrodes may or may not be in the same groups. For example, in some embodiments, receiver electrodes may be of the same shapes and/or sizes while, in other embodiments, receiver electrodes may be varying shapes and/or sizes.

In FIG. 1, a processing system (110) is shown as part of the input device (100). The processing system (110) is configured to operate the hardware of the input device (100) to detect input in the sensing region (120). The processing system (110) includes parts of or all of one or more integrated circuits (ICs) and/or other circuitry components. For example, a processing system for a mutual capacitance sensor device may include transmitter circuitry configured to transmit signals with transmitter sensor electrodes, and/or receiver circuitry configured to receive signals with receiver sensor electrodes. Further, a processing system for an absolute capacitance sensor device may include driver circuitry configured to drive absolute capacitance signals onto sensor electrodes, and/or receiver circuitry configured to receive signals with those sensor electrodes. Further still, a processing system for an optical sensor (e.g., cameras) device may include circuitry configured to obtain and process images of the sensing region. In one more embodiments, a processing system for a combined capacitance sensor device and optical sensor device may include any combination of the above described circuitry. In some embodiments, the processing system (110) also includes electronically-readable instructions, such as firmware code, software code, and/or the like.

In some embodiments, components composing the processing system (110) are located together, such as near sensing element(s) of the input device (100). In other embodiments, components of processing system (110) are physically separate with one or more components close to the sensing element(s) of the input device (100), and one or more components elsewhere. For example, the input device (100) may be a peripheral coupled to a computing device, and the processing system (110) may include software configured to run on a central processing unit of the computing device and one or more ICs (perhaps with associated firmware) separate from the central processing unit. As another example, the input device (100) may be physically integrated in a mobile device, and the processing system (110) may include circuits and firmware that are part of a main processor of the mobile device. In some embodiments, the processing system (110) is dedicated to implementing the input device (100). In other embodiments, the processing system (110) also performs other functions, such as operating display screens, driving haptic actuators, etc.

The processing system (110) may be implemented as a set of modules that handle different functions of the processing system (110). Each module may include circuitry that is a part of the processing system (110), firmware, software, or a combination thereof. In various embodiments, different combinations of modules may be used. For example, as shown in FIG. 1, the processing system (110) may include a determination module (150) and a sensor module (160). The determination module (150) may include functionality to determine when at least one input object is in a sensing region, determine signal to noise ratio, determine positional information of an input object, identify a gesture, determine an action to perform based on the gesture, a combination of gestures or other information, and/or perform other operations.

The sensor module (160) may include functionality to drive the sensing elements to transmit transmitter signals and receive the resulting signals. For example, the sensor module (160) may include sensory circuitry that is coupled to the sensing elements. The sensor module (160) may include, for example, a transmitter module and a receiver module. The transmitter module may include transmitter circuitry that is coupled to a transmitting portion of the sensing elements. The receiver module may include receiver circuitry coupled to a receiving portion of the sensing elements and may include functionality to receive the resulting signals. The sensor module (160) may include functionality to obtain images of the sensing region (120) from one or more cameras.

Although FIG. 1 shows a determination module (150) and a sensor module (160), alternative or additional modules may exist in accordance with one or more embodiments. Such alternative or additional modules may correspond to distinct modules or sub-modules than one or more of the modules discussed above. Example alternative or additional modules include hardware operation modules for operating hardware such as sensor electrodes, cameras, and/or display screens, data processing modules for processing data such as sensor signals and positional information, reporting modules for reporting information, and identification modules configured to identify gestures, such as mode changing gestures, and mode changing modules for changing operation modes. Further, the various modules may be combined in separate integrated circuits. For example, a first module may be comprised at least partially within a first integrated circuit and a separate module may be comprised at least partially within a second integrated circuit. Further, portions of a single module may span multiple integrated circuits. In some embodiments, the processing system as a whole may perform the operations of the various modules.

In some embodiments, the processing system (110) responds to user input (or lack of user input) in the sensing region (120) directly by causing one or more actions. Example actions include changing operation modes, as well as graphical user interface (GUI) actions such as cursor movement, selection, menu navigation, and other functions. In some embodiments, the processing system (110) provides information about the input (or lack of input) to some part of the electronic system (e.g. to a central processing system of the electronic system that is separate from the processing system (110), if such a separate central processing system exists). In some embodiments, some part of the electronic system processes information received from the processing system (110) to act on user input, such as to facilitate a full range of actions, including mode changing actions and GUI actions.

For example, in some embodiments, the processing system (110) operates the sensing element(s) of the input device (100) to produce electrical signals indicative of input (or lack of input) in the sensing region (120). The processing system (110) may perform any appropriate amount of processing on the electrical signals in producing the information provided to the electronic system. For example, the processing system (110) may digitize analog electrical signals obtained from the sensor electrodes. As another example, the processing system (110) may perform filtering or other signal conditioning. As yet another example, the processing system (110) may subtract or otherwise account for a baseline, such that the information reflects a difference between the electrical signals and the baseline. As yet further examples, the processing system (110) may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device (100) is implemented with additional input components that are operated by the processing system (110) or by some other processing system. These additional input components may provide redundant functionality for input in the sensing region (120), or some other functionality. FIG. 1 shows buttons (130) near the sensing region (120) that may be used to facilitate selection of items using the input device (100). Other types of additional input components include sliders, balls, wheels, switches, and the like. Conversely, in some embodiments, the input device (100) may be implemented with no other input components.

In some embodiments, the input device (100) includes a touch screen interface, and the sensing region (120) overlaps at least part of an active area of a display screen. For example, the input device (100) may include substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device (100) and the display screen may share physical elements. For example, some embodiments may utilize some of the same electrical components for displaying and sensing. In various embodiments, one or more display electrodes of a display device may configured for both display updating and input sensing. As another example, the display screen may be operated in part or in total by the processing system (110).

It should be understood that while many embodiments are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media that is readable by the processing system (110)). Additionally, the embodiments of the present invention apply equally regardless of the particular type of medium used to carry out the distribution. For example, software instructions in the form of computer readable program code to perform embodiments of the invention may be stored, in whole or in part, temporarily or permanently, on a non-transitory computer readable storage medium. Examples of non-transitory, electronically readable media include various discs, physical memory, memory, memory sticks, memory cards, memory modules, and or any other computer readable storage medium. Electronically readable media may be based on flash, optical, magnetic, holographic, or any other storage technology.

Although not shown in FIG. 1, the processing system, the input device, and/or the host system may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores, or micro-cores of a processor. Further, one or more elements of one or more embodiments may be located at a remote location and connected to the other elements over a network. Further, embodiments of the invention may be implemented on a distributed system having several nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While FIG. 1 shows a configuration of components, other configurations may be used without departing from the scope of the invention. For example, various components may be combined to create a single component. As another example, the functionality performed by a single component may be performed by two or more components.

Figure 2A:
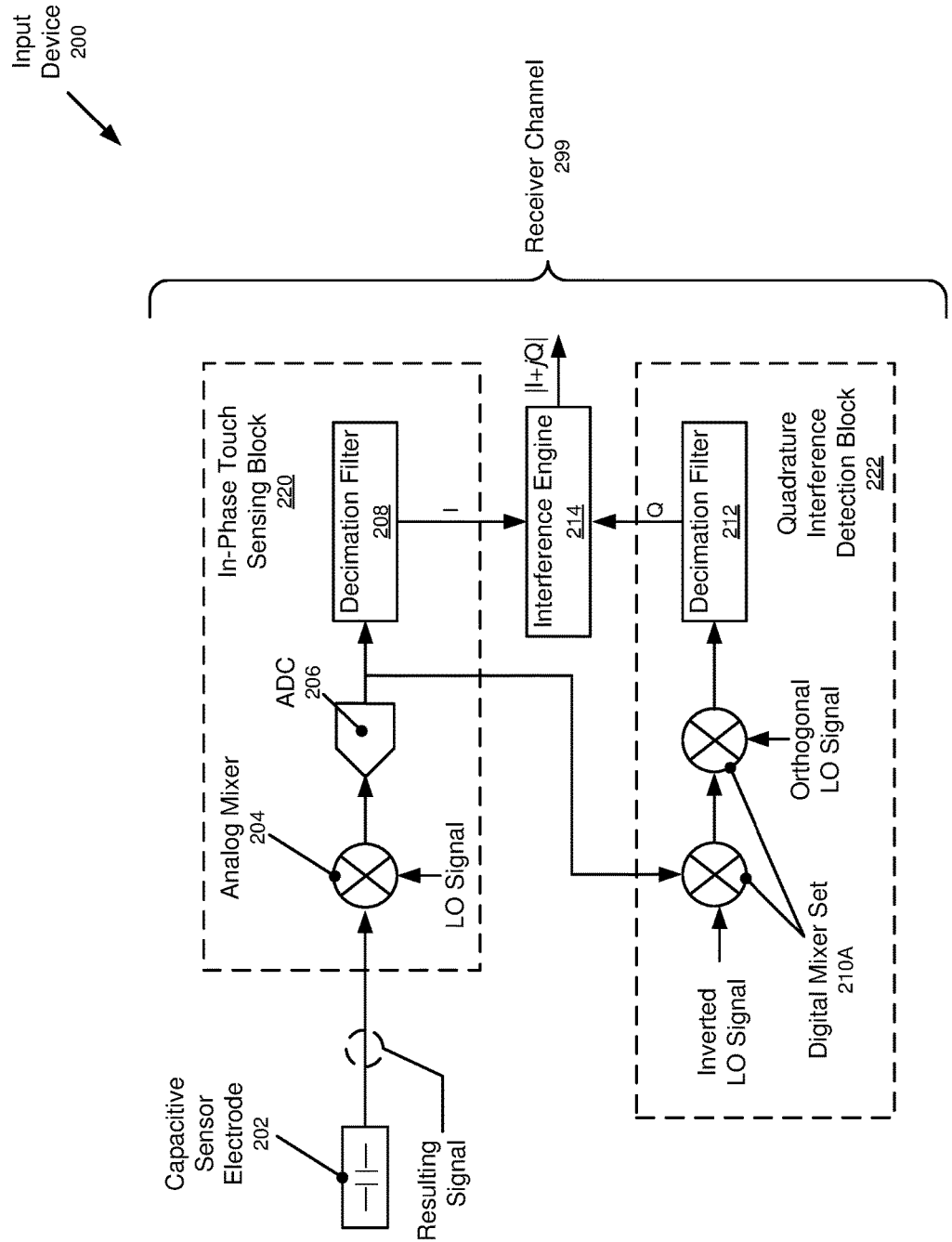
FIGS. 2A and 3A show a block diagram of an in-phase touch sensing block and a quadrature interference detection block in accordance with one or more embodiments.

FIG. 2A shows an input device (200) in accordance with one or more embodiments. The input device (200) may correspond to input device (100), discussed above in reference to FIG. 1. As shown in FIG. 2A, the input device (200) includes an in-phase touch sensing block (220) and a quadrature interference detection block (222). The in-phase touch sensing block (220) is coupled to at least one capacitive sensor electrode (202) associated with the sensing region (120), discussed above in reference to FIG. 1. Moreover, the in-phase touch sensing block (220) and the quadrature interference detection block (222) are coupled to an interference engine (214). The in-phase touch sensing block (220), the quadrature interference detection block (222), and the interference engine (214) form, at least in part, a receiver channel (299). Although FIG. 2A only shows a single receiver channel (299), in one or more embodiments, the input device (200) may have any number of receiver channels.

Further, the in-phase touch sensing block (220), the quadrature interference detection block (222), and the interference engine (214) may be components of the processing system (110), discussed above in reference to FIG. 1. For example, the in-phase touch sensing block (220), the quadrature interference detection block (222), and the interference engine (214) may each be a component of the sensor module (160) and/or the determination module (150), discussed above in reference to FIG. 1.

In one or more embodiments, the in-phase touch sensing block (220) includes an analog mixer (204), an analog to digital converter (ADC) (206), and a decimation filter (208). As shown in FIG. 2A, the input to the in-phase touch sensing block (220) includes a resulting signal associated with the capacitive sensor electrode (202). The resulting signal may be a function of one or more of: (i) a transmitter signal (not shown) that drives the capacitive sensor electrode (202); (ii) user input, if any, in the sensing region (120); and (iii) interference, if any, from one or more sources.

In one or more embodiments, the analog mixer (204) mixes (e.g., down-converts, demodulates, etc.) the resulting signal with a local oscillator (LO) signal. The LO signal has the same, or substantially the same, frequency ($f_0$) and phase as (i.e., phase aligned with) the transmitter signal. The LO signal and the transmitter signal may be sinusoids, square waves, etc.

In one or more embodiments, the ADC (206) generates a digital signal from the output of the analog mixer (204). The ADC (206) may have a sample rate in excess of 1M samples/s. In one or more embodiments, the ADC (206) has a sample rate that is at least twice the frequency of potential/significant interference in the system.

In one or more embodiments, the decimation filter (208) applies a low pass filter to the digital signal from the ADC (206) and down-samples the digital signal from the ADC (206). Those skilled in the art, having the benefit of this detailed description, will appreciate that the decimation filter (208) may perform low pass filtering and down-sampling using multiple filter coefficients.

In one or more embodiments, the in-phase touch sensing block (220) operates in at least two modes. More specifically, the in-phase touch sensing block (220) may operate in different modes during different time windows. In the first mode, the in-phase touch sensing block (220) may detect user input in the sensing region (120) associated with the capacitive sensor electrode (202). While in the first mode, the output of the decimation filter (208) is a measurement of user input proximate to the capacitive sensor electrode (202). In the second mode, when there is no user input, the in-phase touch sensing block (220) may determine the in-phase component of interference at the frequency $f_0$ of the local oscillator signal and transmitter signal. In other words, in the second mode, the output of the demodulator filter (208) is an estimate of the in-phase component (I) of interference at frequency $f_0$.

In one or more embodiments, although the in-phase touch sensing block (220) can determine the in-phase component (I) of the interference at frequency $f_0$, the in-phase touch sensing block (220) cannot determine the quadrature component (Q) of the interference at frequency $f_0$ (i.e., the interference component that is phase-orthogonal or offset 90 degrees from the phase of the LO signal). Both the in-phase component (I) and the quadrature component (Q) may be necessary to correctly determine the interference at frequency $f_0$. Accordingly, if only the in-phase component (I) from the in-phase touch sensing block (220) is used to determine the interference, the determined interference may be an unreliable indicator (e.g., estimate, measurement, etc.) of the actual interference. This is especially true if the majority of interference power is in the quadrature component (Q), and thus not accounted for if the interference is determined solely based on the in-phase component (I).

In one or more embodiments, the receiver channel (299) includes the quadrature interference detection block (222). The quadrature interference detection block (222) is configured to determine (e.g., measure, estimate, etc.) the quadrature component (Q) of interference at frequency $f_0$. Moreover, the quadrature interference detection block (222) operates concurrently with the in-phase touch sensing block (220). In other words, while the in-phase touch sensing block (220) is operating in the second mode and estimating the in-phase component of interference at frequency $f_0$, the quadrature interference detection block (222) is concurrently estimating the quadrature component of interference at frequency $f_0$.

As shown in FIG. 2A, the quadrature interference detection block (222) includes a set of digital mixers (210A) and a decimation filter (212). The decimation filter (212) may be similar (e.g., the same filter coefficients) to the decimation filter (208), discussed above.

As also shown in FIG. 2A, the set of digital mixers (210A) includes an initial digital mixer that mixes the digital signal from the ADC (206) with an inverted and sampled version of the LO signal. For example, if the LO signal is $\cos(2\pi f_0 t)$, the inverted version of the LO signal would be $1/\cos(2\pi f_0 t)$. This effectively undoes the down-sampling/demodulation performed by the analog mixer (204). The set of digital mixers (210A) also may include a subsequent digital mixer that mixes the output of the initial digital mixer with an orthogonal (i.e., phase-orthogonal or offset 90 degrees from phase of the LO signal) and sampled version of the LO signal. For example, if the LO signal is $\cos(2\pi f_0 t)$, the orthogonal version of the LO signal would be $\cos(2\pi f_0 t + \pi/2) = \sin(2\pi f_0 t)$. This effectively creates a quadrature channel. The output of the subsequent digital mixer is passed through the decimation filter (212). Accordingly, the output of the decimation filter (212) is an estimate of the quadrature component (Q) of the interference at frequency $f_0$.

In one or more embodiments, the receiver channel (299) includes the interference engine (214). The interference engine (214) may be implemented in software, hardware (i.e., circuitry), or any combination thereof. The interference engine (214) calculates a magnitude of the interference at frequency $f_0$ based on at least the in-phase component (I) and the quadrature component (Q). In other words, the interference engine (214) effectively calculates |I+jQ|, where j is the unit imaginary number. In one or more embodiments, it is likely that the SNR of Q is less than the SNR of I. Accordingly, the interference engine (214) may deemphasize the weight of Q with respect to I in the calculation of the interference magnitude. For example, the interference engine (214) may calculate |I+jkQ|, where k is a tunable weight ($0 \leq k \leq 1$) that depends on at least the quality (e.g., SNR) of Q. Although the interference engine (214) is shown as being external to the quadrature interference detection block (222), in one or more embodiments, the interference engine (214) is a component of the quadrature interference detection block (222).

In one embodiment, the input device (200) may take one or more countermeasures if the magnitude of the interference exceeds a threshold. For example, if the magnitude of the interference is too large, the input device may change the frequency of the transmitter signals that drive the capacitive sensor electrodes associated with the sensor region (120).

Those skilled in the art, having the benefit of this detailed description, will appreciate that the configuration shown in FIG. 2A allows for both the in-phase component and the quadrature component of interference to be estimated from a single burst of the ADC (206). Moreover, the configuration shown in FIG. 2A does not require additional analog circuitry beyond what is already present in the in-phase touch sensing block (220).

Figure 2B:
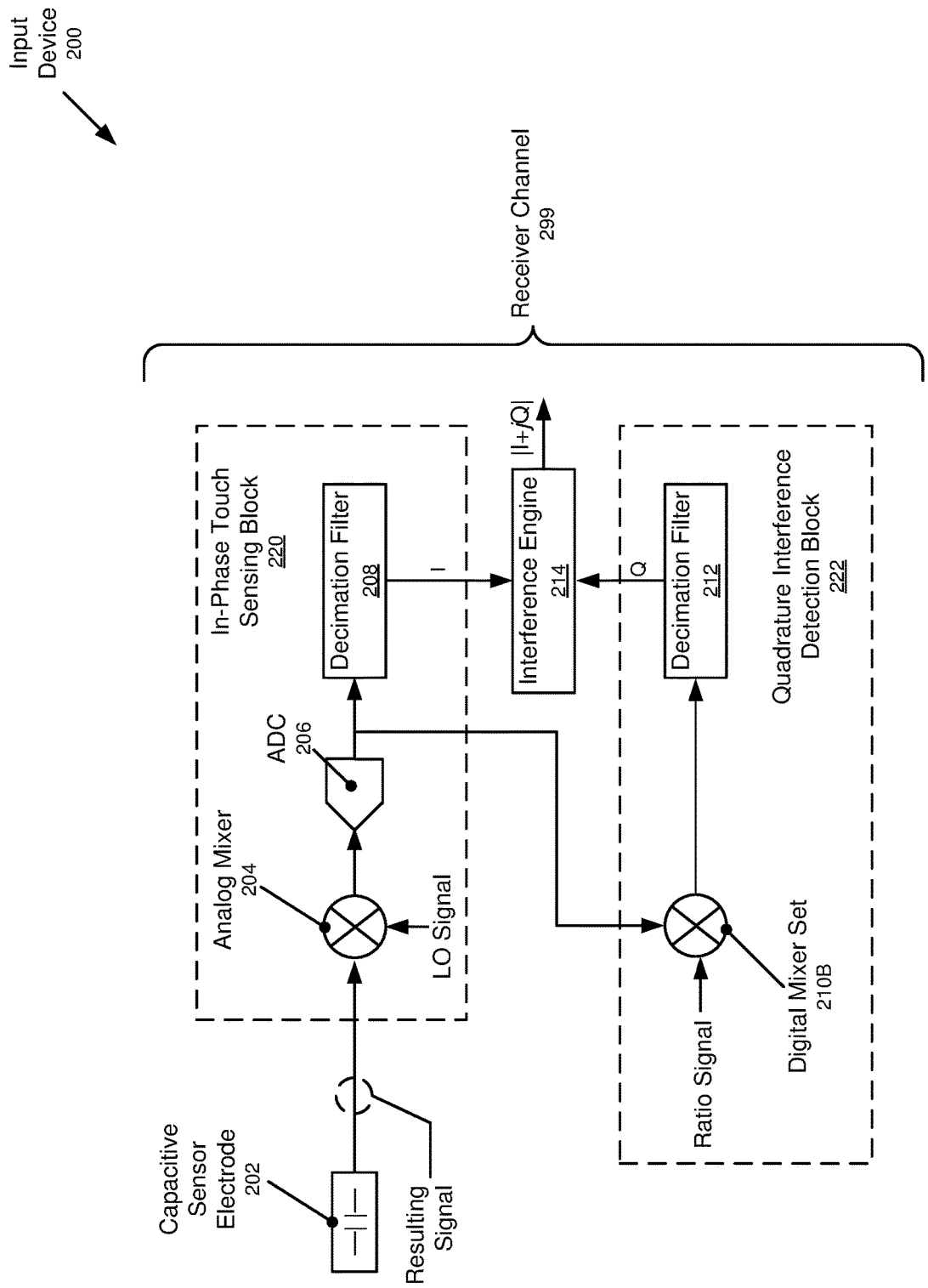
FIGS. 2B and 3B show a block diagram of at least a quadrature interference detection block with multiple decimation filters in accordance with one or more embodiments.

FIG. 2B shows another embodiment of the input device (200). As shown in FIG. 2B, the set of digital mixers (210A), as shown in FIG. 2A, has been replaced with the set of digital mixers (210B). Specifically, the set of digital mixers (210B) includes a single digital mixer that mixes the digital signal from the ADC (206) with a ratio signal. The ratio signal is the ratio of an orthogonal and sampled version of the LO signal to (i.e., divided by) a sampled version of the LO signal. For example, if the LO signal is $\cos(2\pi f_0 t)$, the orthogonal version of the LO signal would be $\cos(2\pi f_0 t + \pi/2) = \sin(2\pi f_0 t)$, and the ratio signal would be a sampled version of $\sin(2\pi f_0 t)/\cos(2\pi f_0 t) =$ a sampled version of $\tan(2\pi f_0 t)$.

Figure 2C:
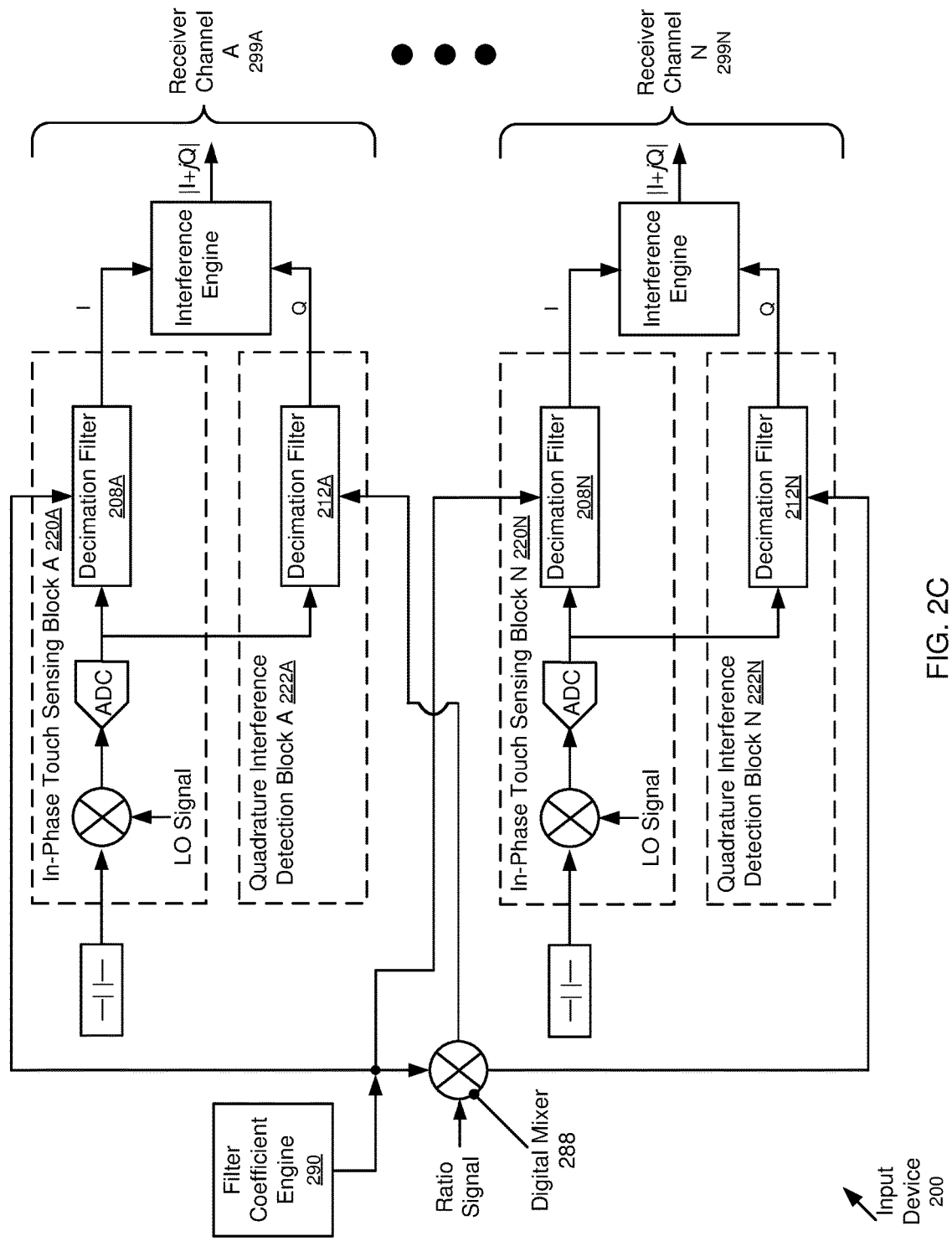
FIGS. 2C and 3C show a block diagram of multiple receiver channels sharing a filter coefficient generator in accordance with one or more embodiments.

FIG. 2C shows yet another embodiment of the input device (200). As shown in FIG. 2C, the input device (200) has multiple receiver channels (i.e., Receiver Channel A (299A), Receiver Channel N (299N)). Each receiver channel (299A, 299N) includes an in-phase touch sensing block (e.g., In-Phase Touch Sensing Block A (220A), In-Phase Touch Sensing Block N (220N)) and a quadrature interference detection block (e.g., Quadrature Interference Detection Block A (222A), Quadrature Interference Detection Block N (222N)). Each in-phase touch sensing block (220A, 220N) is essentially the same as in-phase sensor block (220), discussed above in reference to FIG. 2A. For example, each in-phase sensor block (220A, 220N) includes a decimation filter (e.g., Decimation Filter (208A), Decimation Filter (208N)).

As shown in FIG. 2C, each quadrature interference detection block (222A, 222N) also includes a decimation filter (e.g., Decimation Filter (212A), Decimation Filter (212N)). The digital signals from the ADCs in the in-phase touch sensing blocks (220A, 220N) feed into the decimation filters (212A, 212N) of the quadrature interference detection blocks (222A, 222N).

Still referring to FIG. 2C, the input device (200) includes a filter coefficient engine (290) that generates filter coefficients for decimation filters. One or more of the filter coefficients generated by the filter coefficient engine (290) may be sent (e.g., by broadcast, by multi-cast, by unicast) to the decimation filters (208A, 208N) of the in-phase touch sensing blocks (220A, 220N). The input device (200) also includes a digital mixer (288) that mixes one or more of the filter coefficients generated by the filter coefficient engine (290) with a ratio signal. As discussed above in reference to FIG. 2B, the ratio signal is a ratio of an orthogonal and sampled version of the LO signal to (i.e., divided by) a sampled version of the LO signal. The output of the digital mixer (288) (i.e., mixed filter coefficients) is sent (e.g., by broadcast, by multi-cast, by unicast, etc.) to the decimation filters (212A, 212N) of the quadrature interference detection blocks (222A, 222N).

In the configuration depicted in FIG. 2C, there is no need for a set of digital mixers within each quadrature interference detection block (222A, 222N), as shown in FIG. 2A and FIG. 2B. Instead, the ratio signal is reflected in the mixed filter coefficients that are sent to the decimation filters (212A, 212N). Accordingly, the output of each decimation filter (212A, 212N) is still an estimate of the quadrature component of interference at the frequency of the LO signal. Moreover, the filter coefficients can be calculated and updated at a central location and then sent to multiple receiver channels.

Figure 3A:
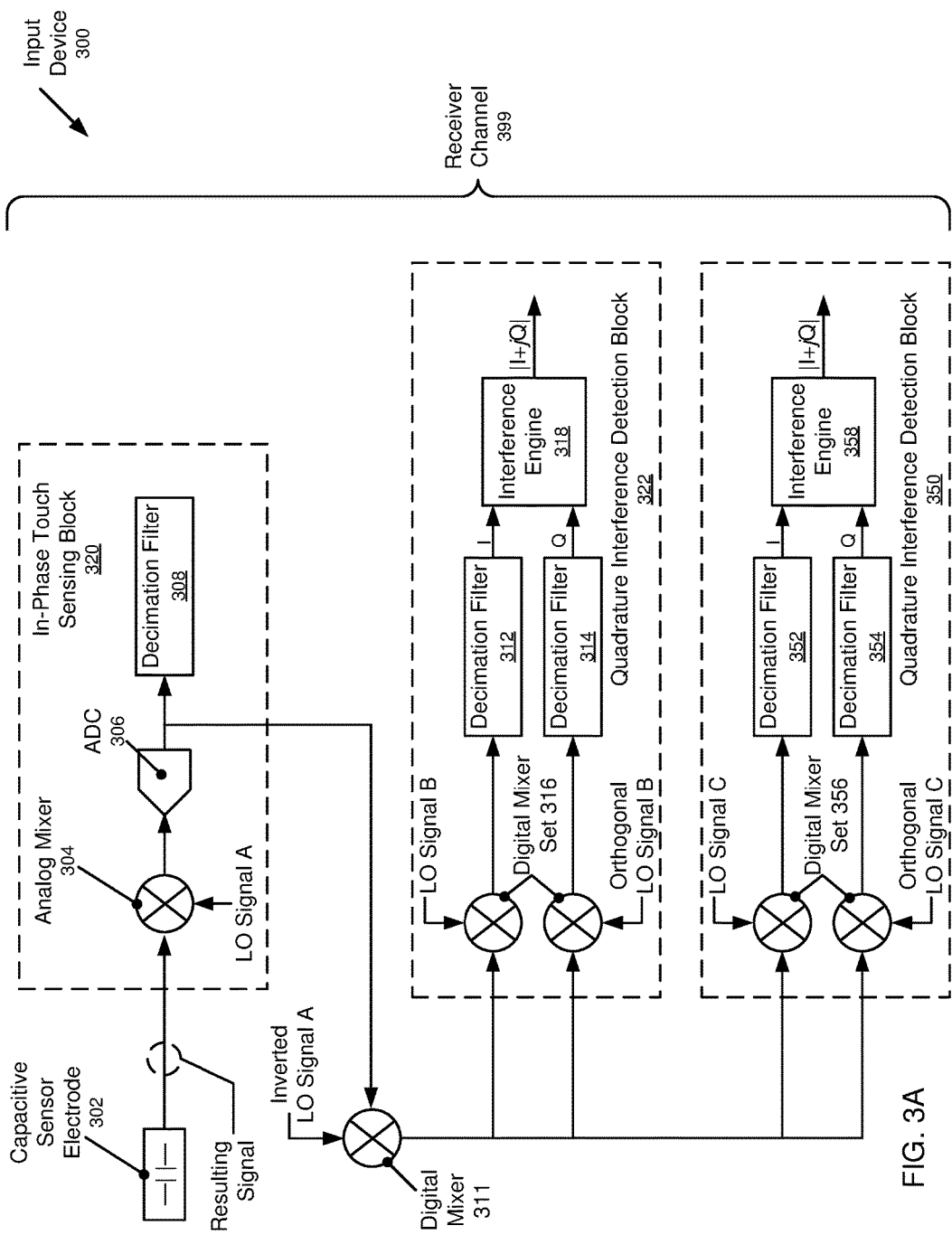

FIG. 3A shows an input device (300) in accordance with one or more embodiments. The input device (300) may correspond to input device (100), discussed above in reference to FIG. 1. As shown in FIG. 3A, the input device (300) includes an in-phase touch sensing block (320) and one or more quadrature interference detection blocks (e.g., Quadrature Interference Detection Block (322), Quadrature Interference Detection Block (350)). The in-phase touch sensing block (320) is coupled to at least one capacitive sensor electrode (302) associated with the sensing region (120), discussed above in reference to FIG. 1. The in-phase touch sensing block (320) and the quadrature interference detection blocks (322, 350) form, at least in part, a receiver channel (399). Although FIG. 3A only shows a single receiver channel (399), in one or more embodiments, the input device (300) may have any number of receiver channels.

Further, the in-phase touch sensing block (320) and the quadrature interference detection blocks (322, 350) may be components of the processing system (110), discussed above in reference to FIG. 1. For example, the in-phase touch sensing block (320) and the quadrature interference detection blocks (322, 350) may each be a component of the sensor module (160) and/or the determination module (150), discussed above in reference to FIG. 1.

In one or more embodiments, the in-phase touch sensing block (320) includes an analog mixer (304), an analog to digital converter (ADC) (306), and a decimation filter (308). As shown in FIG. 3A, the input to the in-phase touch sensing block (320) includes a resulting signal associated with the capacitive sensor electrode (302). The resulting signal is a function of at least: (i) a transmitter signal (not shown) that drives the capacitive sensor electrode (302); (ii) user input, if any, in the sensing region (120); and (iii) interference, if any, from one or more sources.

In one or more embodiments, the analog mixer (304) mixes (e.g., down-converts, demodulates, etc.) the resulting signal with local oscillator (LO) signal A. LO signal A has the same, or substantially the same, frequency ($f_A$) and phase as (i.e., phase aligned with) the transmitter signal. LO signal A and the transmitter signal may be sinusoids, square waves, etc.

In one or more embodiments, the ADC (306) generates a digital signal from the output of the analog mixer (304). The ADC (306) may have a sample rate in excess of 1M samples/s. In one or more embodiments, the ADC (306) has a sample rate that is at least twice the frequency of potential/significant interference in the system.

In one or more embodiments, the decimation filter (308) applies a low pass filter to the digital signal from the ADC (306) and down-samples the digital signal from the ADC (306). Those skilled in the art, having the benefit of this detailed description, will appreciate that the decimation filter (308) may perform low pass filtering and down-sampling using multiple filter coefficients.

In one or more embodiments, the in-phase touch sensing block (320) detects user input in the sensing region (120) associated with the capacitive sensor electrode (302). In other words, the output of the demodulation filter (308) is a measurement of user input proximate to the capacitive sensor electrode (302).

In one or more embodiments, the receiver channel (399) includes the digital mixer (311). The digital mixer (311)

mixes the digital signal from the ADC (306) with an inverted and sampled version of LO signal A. For example, if LO signal A is $\cos(2\pi f_A t)$, the inverted version of LO signal A would be $1/\cos(2\pi f_A t)$. This effectively undoes the down-sampling/demodulation performed by the analog mixer (304).

In one or more embodiments, the receiver channel (399) includes the quadrature interference detection block (322). The quadrature interference detection block (322) is configured to estimate both the in-phase (I) and the quadrature component (Q) of interference at frequency $f_B$ (i.e., a frequency different from the frequency $f_A$ of LO signal A). Moreover, the quadrature interference detection block (322) operates concurrently with the in-phase touch sensing block (320). In other words, while the in-phase touch sensing block (320) is measuring/detecting user input, the quadrature interference detection block (322) is estimating both the in-phase component (I) and the quadrature component (Q) of interference at frequency $f_B$.

As shown in FIG. 3A, the quadrature interference detection block (322) includes a set of digital mixers (316) and multiple (e.g., a pair of) decimation filters (e.g., decimation filter (312), decimation filter (314))). The decimation filters (312, 314) may be similar (e.g., the same filter coefficients) to the decimation filter (308), discussed above.

As also shown in FIG. 3A, the set of digital mixers (316) includes: (i) a digital mixer that mixes the output of digital mixer (311) with LO signal B having the frequency $f_B$ and feeds the result to decimation filter (312); and (ii) a digital mixer that mixes the output of the digital mixer (311) with an orthogonal (i.e., phase-orthogonal or offset 90 degrees from phase of LO signal B) version of LO signal B and feeds the result to decimation filter (314). For example, if LO signal B is $\cos(2\pi f_B t)$, the orthogonal version of LO signal B would be $\cos(2\pi f_B t+\pi/2)=\sin(2\pi f_B t)$. Accordingly, the output of the decimation filter (312) is an estimate of the in-phase component (I) of the interference at frequency $f_B$. Moreover, the output of the decimation filter (314) is an estimate of the quadrature component (Q) of the interference at frequency $f_B$.

In one or more embodiments, the quadrature interference detection block (322) includes the interference engine (318). The interference engine (318) may be implemented in software, hardware (i.e., circuitry), or any combination thereof. The interference engine (318) calculates a magnitude of the interference at frequency $f_B$ based on the in-phase component (I) and the quadrature component (Q). In other words, the interference engine (318) effectively calculates $|I+jQ|$ at frequency $f_B$. In one or more embodiments, the interference engine (318) is similar to interference engine (214), discussed above with respect to FIG. 2A. Accordingly, interference engine (318) may also calculate, for example, $|I+jkQ|$, where $0 \le k \le 1$, depending on the SNR of I and the SNR of Q.

In one or more embodiments, the receiver channel (399) includes the quadrature interference detection block (350). The quadrature interference detection block (350) is configured to estimate both the in-phase (I) and the quadrature component (Q) of interference at frequency $f_C$ (i.e., a frequency different from the frequency $f_A$ of LO signal A). Moreover, the quadrature interference detection block (350) operates concurrently with the in-phase touch sensing block (320). In other words, while the in-phase touch sensing block (320) is measuring/detecting user input, the quadrature interference detection block (322) is estimating both the in-phase component (I) and the quadrature component (Q) of interference at frequency $f_C$.

As shown in FIG. 3A, the quadrature interference detection block (350) includes a set of digital mixers (356) and multiple (e.g., a pair of) decimation filters (e.g., decimation filter (352), decimation filter (354))). The decimation filters (352, 354) may be similar (e.g., the same filter coefficients) to the decimation filter (308), discussed above.

As also shown in FIG. 3A, the set of digital mixers (356) includes: (i) a digital mixer that mixes the output of digital mixer (311) with LO signal C having the frequency $f_C$ and feeds the result to decimation filter (352); and (ii) a digital mixer that mixes the output of the digital mixer (311) with an orthogonal (i.e., phase-orthogonal or offset 90 degrees from phase of LO signal C) version of LO signal C and feeds the result to decimation filter (354). For example, if LO signal C is $\cos(2\pi f_C t)$, the orthogonal version of LO signal C would be $\cos(2\pi f_C t+\pi/2)=\sin(2\pi f_C t)$. Accordingly, the output of the decimation filter (352) is an estimate of the in-phase component (I) of the interference at frequency $f_C$. Moreover, the output of the decimation filter (354) is an estimate of the quadrature component (Q) of the interference at frequency $f_C$.

In one or more embodiments, the quadrature interference detection block (350) includes the interference engine (358). The interference engine (358) may be implemented in software, hardware (i.e., circuitry), or any combination thereof. The interference engine (358) calculates a magnitude of the interference at frequency $f_C$ based on the in-phase component (I) and the quadrature component (Q). In other words, the interference engine (358) effectively calculates $|I+jQ|$ at frequency $f_C$. In one or more embodiments, the interference engine (358) is similar to interference engine (214), discussed above with respect to FIG. 2A. Accordingly, interference engine (358) may also calculate, for example, $|I+jkQ|$, where $0 \le k \le 1$, depending on the SNR of I and the SNR of Q.

In one or more embodiments, the input device (300) may take one or more actions if the magnitude of the interference at frequency $f_B$ or the magnitude of the interference at frequency $f_C$ falls below a threshold. For example, if the magnitude of the interference at $f_C$ is very small, the input device may change the frequency of the transmitter signals that drive the capacitive sensor electrodes to $f_C$.

Those skilled in the art, having the benefit of this detailed description, will appreciate that the configuration shown in FIG. 3A allows for user input detection and interference estimation, at multiple frequencies, to be performed based on a single burst of the ADC (306). Moreover, the configuration shown in FIG. 3A does not require additional analog circuitry beyond what is already present in the in-phase touch sensing block (320).

Figure 3B:
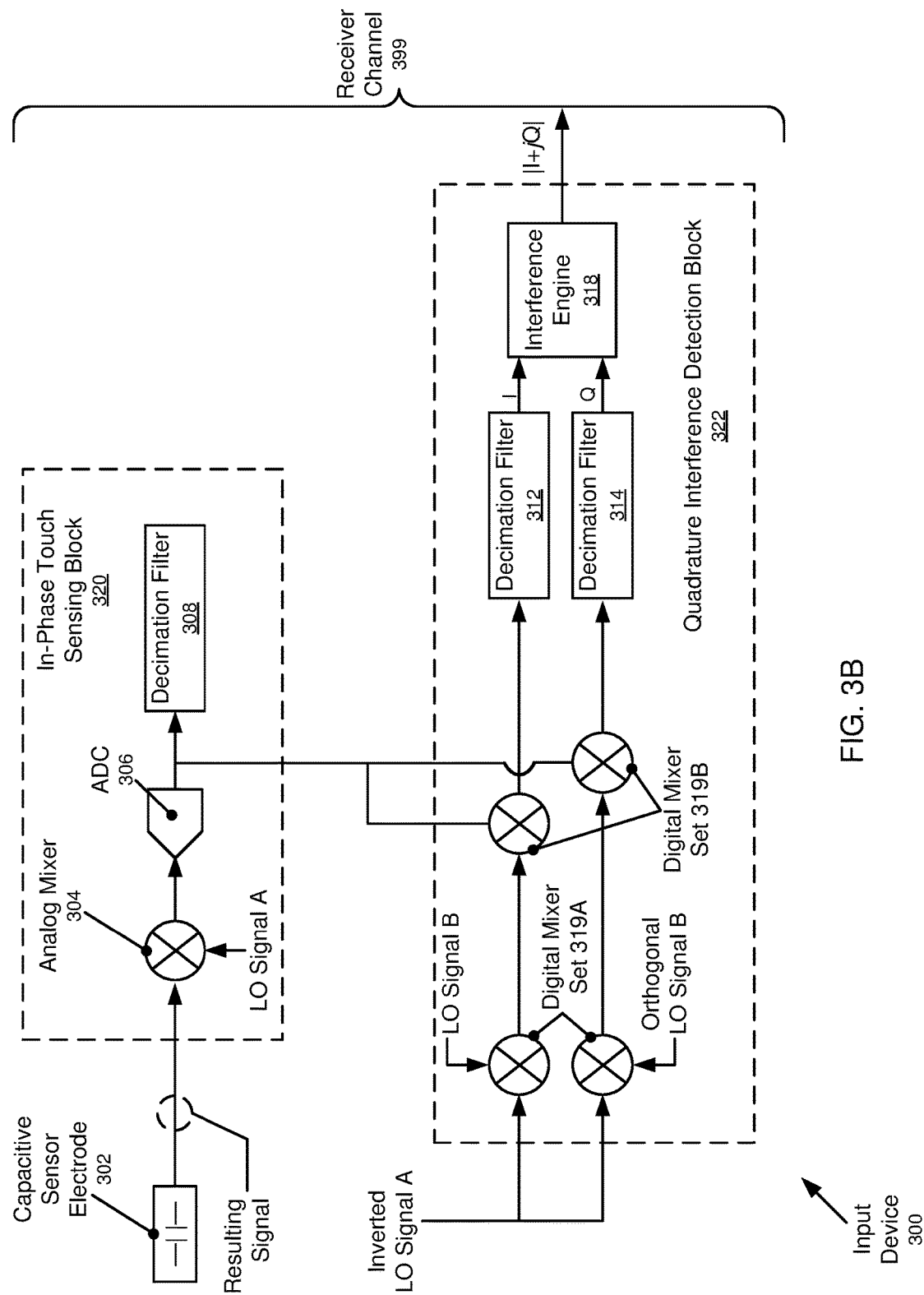

FIG. 3B shows an additional and/or alternative version of the input device (300) in accordance with one or more embodiments. Specifically, the digital mixer (311) and the set of digital mixers (316), as shown in FIG. 3A, have been replaced with two sets of digital mixers (319A, 319B). An initial set of digital mixers (319A) mixes the inverted and sampled version of LO signal A with LO signal B and an orthogonal version of LO signal B. For example, if LO signal B is $\cos(2\pi f_B t)$, the orthogonal version of LO signal B would be $\cos(2\pi f_B t+\pi/2)=\sin(2\pi f_B t)$. A subsequent set of digital mixers (319B) mixes the outputs of the initial set of digital mixers (319A) with the digital signal from the ADC (306). Like FIG. 3A, the output of the decimation filter (312) is an estimate of the in-phase component (I) of the interference at frequency $f_B$, and the output of the decimation filter (354) is an estimate of the quadrature component (Q) of the interference at frequency $f_B$.

Figure 3C:
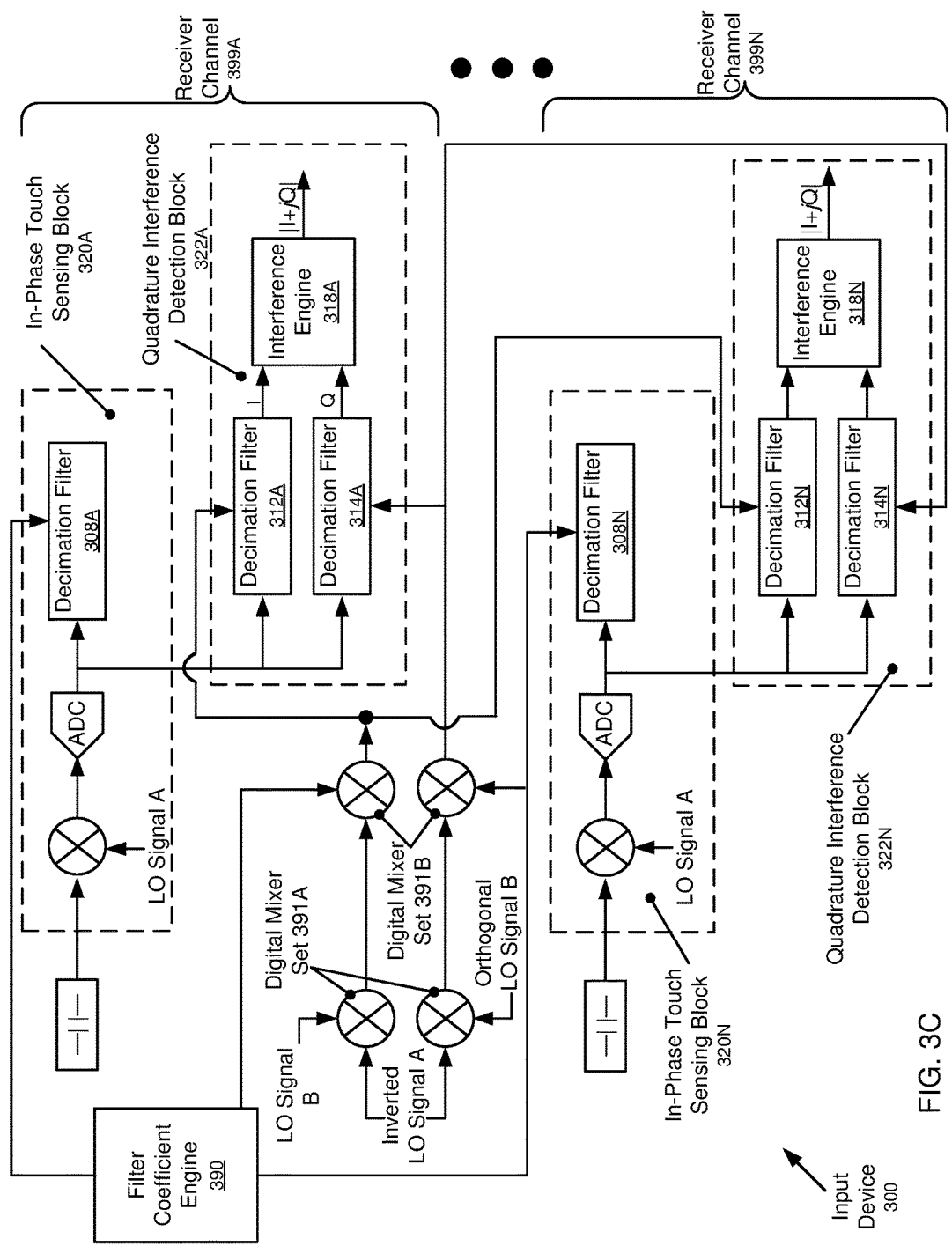

FIG. 3C shows an additional and/or alternative version of the input device (300) in accordance with one or more embodiments. As shown in FIG. 3C, the input device (300) has multiple receiver channels (i.e., Receiver Channel A (399A), Receiver Channel N (399N)). Each receiver channel (399A, 399N) includes an in-phase touch sensing block (e.g., In-Phase Touch Sensing Block A (320A), In-Phase Touch Sensing Block N (320N)) and a quadrature interference detection block (e.g., Quadrature Interference Detection Block A (322A), Quadrature Interference Detection Block N (322N)). Each in-phase touch sensing block (320A, 320N) is essentially the same as in-phase sensor block (320), discussed above in reference to FIG. 3A. For example, each in-phase sensor block (320A, 320N) includes a decimation filter (e.g., Decimation Filter (308A), Decimation Filter (308N)).

As shown in FIG. 3C, each quadrature interference detection block (322A, 322N) also includes multiple (e.g., a pair of) decimation filters (e.g., Decimation Filter (312A), Decimation Filter (312N), Decimation Filter (314A), Decimation Filter (314N)). The digital signals from the ADCs in the in-phase touch sensing blocks (320A, 320N) feed directly into the decimation filters (312A, 312N, 314A, 314N) of the quadrature interference detection blocks (322A, 322N).

Still referring to FIG. 3C, the input device (300) includes a filter coefficient engine (390) that generates filter coefficients for decimation filters. One or more of the filter coefficient generated by the filter coefficient engine (390) are sent to the decimation filters (308A, 308N) of the in-phase touch sensing blocks (320A, 320N). The input device (300) also includes the two sets of digital mixers (391A, 391B). An initial set of digital mixers (391A) mixes the inverted and sampled version of LO signal A with LO signal B and an orthogonal version of LO signal B. The subsequent set of digital mixers (391B) mixes the outputs of the initial set of digital mixers (391A) with the one or more filter coefficients generated by the filter coefficient engine (390). The output of the subsequent set of digital mixers (391B) (i.e., mixed filter coefficients) is sent to the decimation filters (312A, 312N, 314A, 314N) of the quadrature interference detection blocks (322A, 322N).

In the configuration depicted in FIG. 3C, there is no need for a set of digital mixers within each quadrature interference detection block (322A, 322N), as shown in FIG. 3A and FIG. 3B. Instead, LO signal B and the orthogonal version of LO signal B are reflected in the mixed filter coefficients that are sent to the decimation filters (312A, 312N, 314A, 314N). However, in FIG. 3C, the filter coefficients can be calculated and updated at a central location and then sent to multiple receiver channels.

Figure 4A:
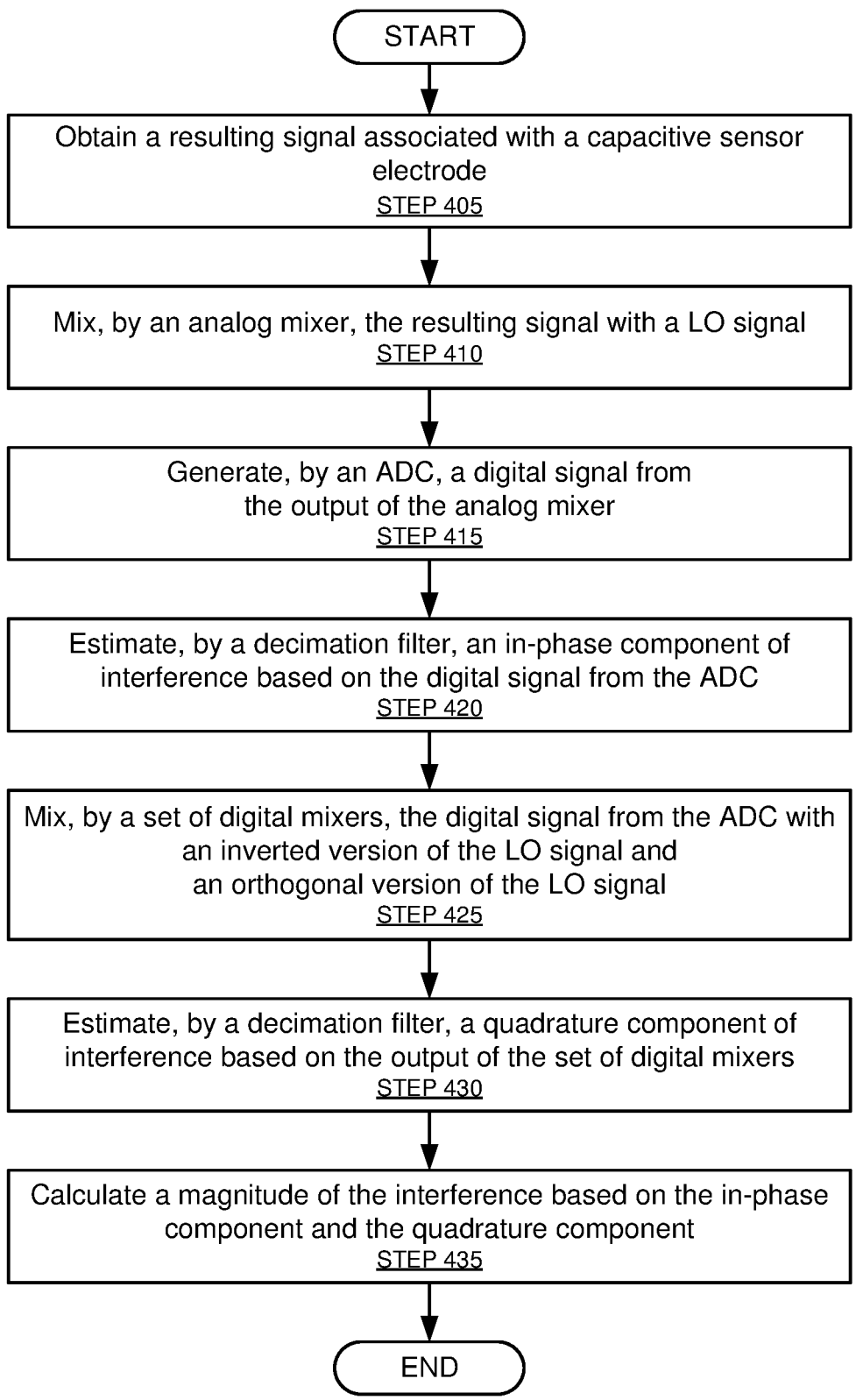
FIG. 4A shows a flowchart in accordance with one or more embodiments.

FIG. 4A shows a flowchart in accordance with one or more embodiments. The flowchart of FIG. 4A depicts a method for operating an input device. One or more of the steps in FIG. 4A may be performed by the components of the input device (200), discussed above in reference to FIGS. 2A-2C. In one or more embodiments, one or more of the steps shown in FIG. 4A may be omitted, repeated, and/or performed in a different order than the order shown in FIG. 4A. Accordingly, the scope of the invention should not be considered limited to the specific arrangement of steps shown in FIG. 4A.

Initially, a resulting signal is obtained from a capacitive sensor electrode associated with a sensing region (STEP 405). The resulting signal may be a function of one or more of: a transmitter signal, user input in the sensing region (if any), and/or interference from one or more sources.

In STEP 410, the resulting signal is mixed with an LO signal using an analog mixer. The LO signal and the transmitter signal have the same, or substantially the same, frequency and the same phase. For example, the LO signal and the transmitter signal may both have a frequency of $f_0$. The transmitter signal and the LO signal may be a sinusoid, a square wave, etc. Mixing the resulting signal with the LO signal effectively down-converts the resulting signal.

In STEP 415, an ADC generates a digital signal from the output of the analog mixer. The ADC may have a sampling rate in excess of 1M samples/s. In one or more embodiments, the ADC has a sample rate that is at least twice the frequency of potential/significant interference in the system.

In STEP 420, a decimation filter is applied to the digital signal from the ADC. The output of the decimation filter is an estimate of the in-phase component of interference at frequency $f_0$ (i.e., the frequency of the LO signal and transmitter signal). The decimation filter, the ADC, and the analog mixer may all be located in an in-phase touch sensing block of a receiver channel. When not being used to estimate the in-phase component of interference, the in-phase touch sensing block may be used to measure/detect user input in the sensing region proximate the capacitive sensor electrode.

In STEP 425, a set of digital mixers (i.e., one or more digital mixers) are used to mix the digital signal from the ADC with an inverted and sampled version of the LO signal and with an orthogonal and sampled version of the LO signal. For example, the set of digital mixers may correspond to digital mixer set (210A), discussed above in reference to FIG. 2A. Additionally or alternatively, the set of digital mixers may correspond to digital mixer set (210B), discussed above in reference to FIG. 2B.

In STEP 430, a decimation filter is applied to the output of the set of digital mixers. The output of the decimation filter is an estimate of the quadrature component of interference at frequency $f_0$ (i.e., the frequency of the LO signal and transmitter signal). The decimation filter and the set of digital mixers may all be located in a quadrature interference detection block of a receiver channel. Moreover, STEP 430 may be performed concurrently with STEP 420.

In STEP 435, a magnitude of the interference at frequency $f_0$ is calculated from the in-phase component (I) of the interference and the quadrature component (Q) of the interference. In other words, $|I+jkQ|$ is calculated, where $0 \leq k \leq 1$, depending on the SNR of I and the SNR of Q. If the magnitude exceeds a threshold, the input device may execute counter measures to mitigate the interference. For example, the input device may change the frequency of the transmitter signal.

Figure 4B:
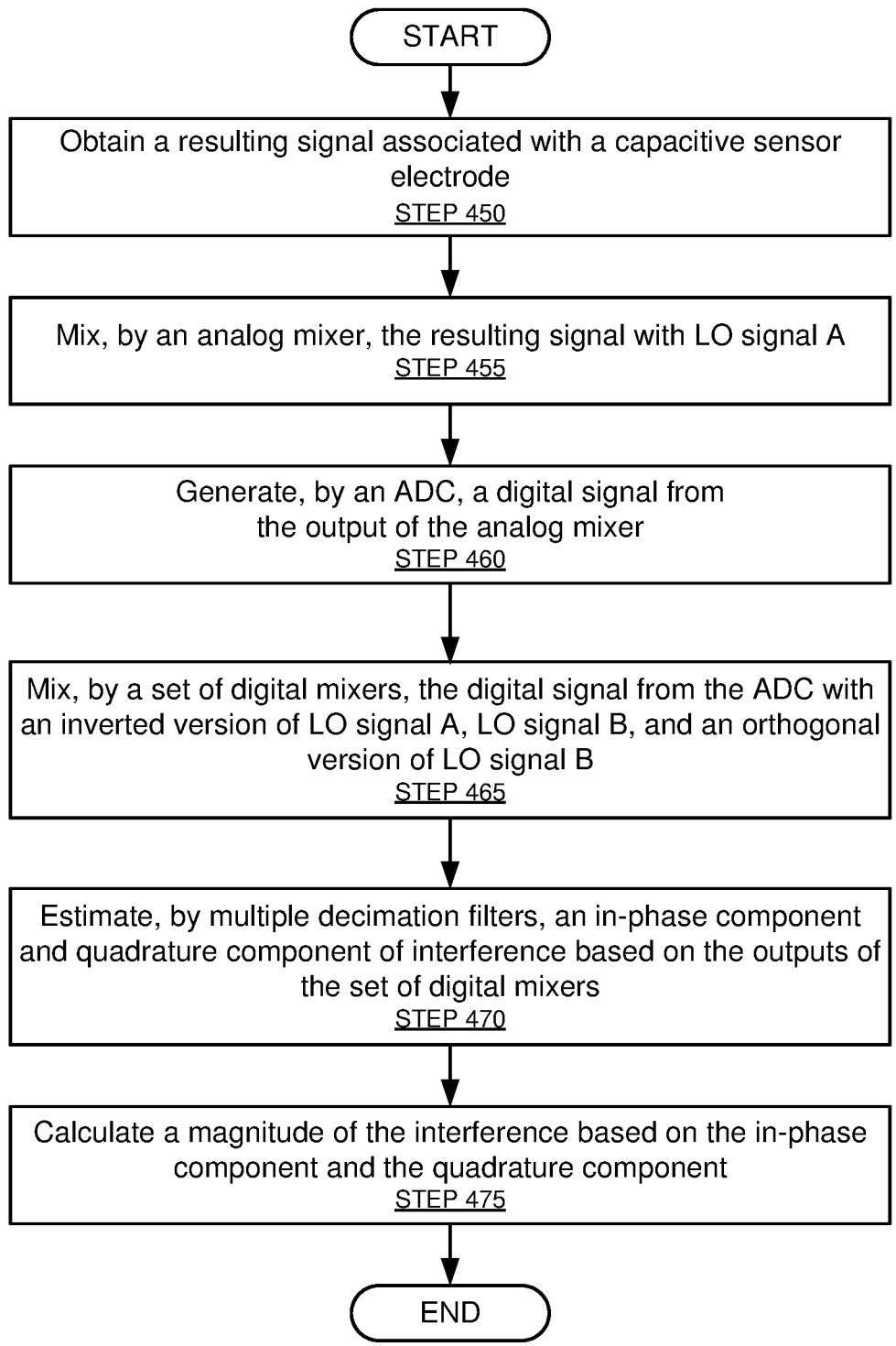
FIG. 4B shows a flowchart in accordance with one or more embodiments.

FIG. 4B shows a flowchart in accordance with one or more embodiments. The flowchart of FIG. 4B depicts a method for operating an input device. One or more of the steps in FIG. 4B may be performed by the components of the input device (300), discussed above in reference to FIGS. 3A-3C. In one or more embodiments, one or more of the steps shown in FIG. 4B may be omitted, repeated, and/or performed in a different order than the order shown in FIG. 4B. Accordingly, the scope of the invention should not be considered limited to the specific arrangement of steps shown in FIG. 4B.

Initially, a resulting signal is obtained from a capacitive sensor electrode associated with a sensing region (STEP 450). The resulting signal is a function of a transmitter signal, user input in the sensing region (if any), and interference from one or more sources.

In STEP 455, the resulting signal is mixed with LO signal A. The mixing is performed by an analog mixer. LO signal A and the transmitter signal have the same, or substantially the same, frequency and phase. For example, the LO signal and the transmitter signal may have a frequency of $f_A$. The transmitter signal and LO signal A may be a sinusoid, a square wave, etc. Mixing the resulting signal with LO signal A effectively down-converts the resulting signal.

In STEP 460, an ADC generates a digital signal from the output of the analog mixer. The ADC may have a sampling rate in excess of 1M samples/s. In one or more embodiments, the ADC has a sample rate that is at least twice the frequency of potential/significant interference in the system. The ADC and the analog mixer may be located in the same in-phase touch sensing block of a receiver channel. This in-phase touch sensing block may be used to measure/detect user input in the sensing region proximate the capacitive sensor electrode.

In STEP 465, a set of digital mixers is used to mix the digital signal from the ADC with an inverted and sampled version of LO signal A, LO signal B, and an orthogonal version of LO signal B. LO signal B has a frequency $f_B$ that is different than the frequency of LO signal A. For example, the set of digital filters in STEP 465 may correspond to one or more of digital filter set (316), digital filter set (319A), and digital filter set (319B), discussed above in reference to FIG. 3A and FIG. 3B.

In STEP 470, multiple decimation filters are used to estimate the in-phase component of interference at frequency $f_B$ and the quadrature component of interference at frequency $f_B$. The multiple decimation filters and the set of digital mixer may be located in the same quadrature interference detection block. Moreover, STEP 470 may be performed while the corresponding in-phase touch sensing block is detecting/measuring user input.

In STEP 475, a magnitude of the interference at frequency $f_B$ is calculated from the in-phase component (I) of the interference and the quadrature component (Q) of the interference. In other words, $|I+jkQ|$ is calculated, where $0 \leq k \leq 1$, depending on the SNR of I and the SNR of Q. If the magnitude is less than a threshold, the input device may change the frequency of the transmitter signal from $f_A$ to $f_B$.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An input device, comprising:
an in-phase touch sensing block comprising:
an analog mixer configured to mix a resulting signal associated with a capacitive sensor electrode with a local oscillator (LO) signal;
an analog to digital converter (ADC) configured to convert an output of the analog mixer into a digital signal; and
a first decimation filter configured to determine an in-phase component of an interference at a frequency of the LO signal based, at least in part, on the digital signal; and
a quadrature interference detection block comprising:
a first digital mixer configured to mix the digital signal from the ADC with an additional digital signal associated with an inverted and sampled version of the LO signal; and
a second decimation filter configured to determine a quadrature component of the interference at the frequency based on an output of the first digital mixer.

2. The input device of claim 1, further comprising:
an interference engine configured to determine the interference based, at least in part, on the in-phase component determined by the first decimation filter and the quadrature component determined by the second decimation filter.

3. The input device of claim 1, wherein the quadrature interference detection block further comprises:
a second digital mixer configured to mix the output of the first digital mixer with an orthogonal and sampled version of the LO signal,
wherein the second decimation filter inputs an output signal of the second digital mixer, and
wherein the additional digital signal is the inverted and sampled version of the LO signal.

4. The input device of claim 1, wherein the additional digital signal is a ratio signal, and wherein the ratio signal is a ratio of an orthogonal and sampled version of the LO signal to the sampled version of the LO signal.

5. The input device of claim 1, wherein the LO signal comprises a square wave.

6. The input device of claim 1, wherein the first decimation filter determines the in-phase component during a first time window, wherein the second decimation filter determines the quadrature component during the first time window, and wherein the in-phase touch sensing block detects user input proximate to the capacitive sensor electrode during a second time window.

7. An input device, comprising:
a first in-phase touch sensing block comprising:
an analog mixer configured to mix a resulting signal associated with a capacitive sensor electrode with a local oscillator (LO) signal;
an analog to digital converter (ADC) configured to convert an output of the analog mixer into a digital signal; and
a first decimation filter configured to determine an in-phase component of an interference at a frequency of the LO signal based, at least in part, on the digital signal;
a first quadrature interference detection block comprising a second decimation filter configured to determine a quadrature component of the interference at the frequency;
a second in-phase touch sensing block comprising a third decimation filter;
a second quadrature interference detection block comprising a fourth decimation filter;
a filter coefficient engine configured to calculate a plurality of filter coefficients; and
a digital mixer configured to mix, for use by the second decimation filter and the fourth decimation filter, the plurality of filter coefficients with a ratio signal, wherein the ratio signal is a ratio of an orthogonal and sampled version of the LO signal to a sampled version of the LO signal.

8. An input device, comprising:
a first in-phase touch sensing block configure to detect user input proximate to a first capacitive sensor electrode and comprising:
an analog mixer configured to mix a resulting signal associated with the first capacitive sensor electrode with a first local oscillator (LO) signal, wherein the first LO signal comprises a first frequency; and
an analog to digital converter (ADC) configured to convert an output of the analog mixer into a digital signal;
a first digital mixer configured to mix the digital signal from the ADC with an additional digital signal associated with an inverted and sampled version of the first LO signal; and
a first quadrature interference detection block comprising a first plurality of decimation filters configured to determine:
an in-phase component of an interference at a second frequency based on an output of the first digital mixer; and
a quadrature component of the interference at the second frequency.

9. The input device of claim 8, further comprising:
a second quadrature interference detection block comprising:
a second plurality of decimation filters configured to determine, based on the digital signal from the ADC, an in-phase component and a quadrature component of an interference at a third frequency while the first in-phase touch sensing block is detecting user input.

10. The input device of claim 8, further comprising:
an interference engine configured to determine the interference based on at least the in-phase component and the quadrature component.

11. The input device of claim 8, wherein the first quadrature interference detection block further comprises:
a second digital mixer configured to mix the output of the first digital mixer with a second LO signal comprising the second frequency; and
a third digital mixer configured to mix the output of the first digital mixer with an orthogonal version of the second LO signal,
wherein each of the second digital mixer and the third digital mixer is connected to one of the first plurality of decimation filters.

12. The input device of claim 8, wherein the first quadrature interference detection block further comprises:
a second digital mixer configured to mix the inverted and sampled version of the first LO with a second LO signal comprising the second frequency, wherein the additional digital signal is an output of the second digital mixer;
a third digital mixer configured to mix the inverted and sampled version of the first LO with an orthogonal version of the second LO signal; and
a fourth digital mixer configured to mix an output of the third digital mixer with the digital signal from the ADC,
wherein each of the first digital mixer and the fourth digital mixer is connected to one of the first plurality of decimation filters.

13. The input device of claim 8, wherein the first local oscillator signal comprises a square wave.

14. An input device, comprising:
a first in-phase touch sensing block configure to detect user input proximate to a first capacitive sensor electrode and comprising:
an analog mixer configured to mix a resulting signal associated with the first capacitive sensor electrode with a first local oscillator (LO) signal, wherein the first LO signal comprises a first frequency; and
an analog to digital converter (ADC) configured to convert an output of the analog mixer into a digital signal; and
a first quadrature interference detection block comprising:
a first plurality of decimation filters configured to determine, based at least in part on the digital signal from the ADC, an in-phase component and a quadrature component of an interference at a second frequency;
a second in-phase touch sensing block configured to detect user input proximate to a second capacitive sensor electrode;
a second quadrature interference detection block comprising a second plurality of decimation filters;
a filter coefficient engine configured to determine a plurality of filter coefficients;
a first digital mixer configured to mix an inverted and sampled version of the first LO signal with a second LO signal comprising the second frequency;
a second digital mixer configured to mix the inverted and sampled version of the first LO signal with an orthogonal version of the second LO signal;
a third digital mixer configured to mix an output of the first digital mixer with a first filter coefficient of the plurality of filter coefficients; and
a fourth digital mixer configured to mix an output of the second digital mixer with a second filter coefficient of the plurality of filter coefficients,
wherein one of the first plurality of decimation filters and one of the second plurality of decimation filters operates using an output of the third digital mixer, and
wherein one of the first plurality of decimation filters and one of the second plurality of decimation filters operates using an output of the fourth digital mixer.

15. A method for operating an input device, comprising:
obtaining a resulting signal associated with a capacitive sensor electrode;
mixing, by an analog mixer, the resulting signal with a first local oscillator (LO) signal comprising a first frequency;
converting, by an analog to digital converter (ADC), an output of the analog mixer into a first digital signal;
mixing, by a first digital mixer, the first digital signal with a second digital signal associated with an inverted and sampled version of the first version LO signal; and
determining, by a first decimation filter and based on an output of the first digital mixer, a quadrature component of an interference.

16. The method of claim 15, further comprising:
determining, by a second decimation filter and based on the digital signal, an in-phase component of the interference at the first frequency,
wherein the second decimation filter, the ADC, and the analog mixer are located in an in-phase touch sensing block,
wherein the second digital signal is a ratio of an orthogonal and sampled version of the first LO signal to a sampled version of the first LO signal,
wherein the first decimation filter is connected to the output of the first digital mixer, and wherein the first digital mixer and the first decimation filter are located in a quadrature interference detection block.

17. The method of claim 15, further comprising:

determining, by a second decimation filter and based on the digital signal, an in-phase component of the interference at the first frequency, wherein the second decimation filter, the ADC, and the analog mixer are located in an in-phase touch sensing block; and mixing, by a second digital mixer, the output of the first digital mixer with an orthogonal and sampled version of the first LO signal, wherein the second digital signal is the inverted and sampled version of the first LO signal, wherein the first decimation filter is connected to an output of the second digital mixer, and wherein the first digital mixer, the second digital mixer, and the first decimation filter are located in a quadrature interference detection block.

18. The method of claim 15, further comprising:

mixing, by a second digital mixer, the output of the first digital mixer and a second LO signal comprising a second frequency;

determining, by a second decimation filter and based on an output of the second digital mixer, an in-phase component of the interference at the second frequency; and mixing, by a third digital mixer, the output of the first digital mixer with an orthogonal version of the second LO signal, wherein the second digital signal is the inverted and sampled version of the first LO signal, and wherein the first decimation filter is connected to an output of the third digital mixer.

19. The method of claim 15, further comprising:

mixing, by a second digital mixer, the inverted and sampled version of the first LO signal with a second LO signal comprising a second frequency;

mixing, by a third digital mixer, an output of the second digital mixer with the first digital signal from the ADC;

determining, by a second decimation filter and based on an output of the third digital mixer, an in-phase component of the interference at the second frequency, wherein the second decimation filter is connected to the output of the third digital mixer; and mixing, by a fourth digital mixer, the inverted and sampled version of the first LO signal with an orthogonal version of the second LO signal, wherein the second digital signal is an output of the fourth digital mixer, and wherein the first decimator filter is connected to the output of the first digital mixer.

20. The method of claim 15, further comprising:

determining the interference based on the quadrature component and an in-phase component of the interference.

* * * * *